United States Patent [19]

Wang

[11] Patent Number: 5,787,761
[45] Date of Patent: Aug. 4, 1998

[54] CABLE SLACK ADJUSTER

[75] Inventor: Nui Wang, Croydon, Australia

[73] Assignee: PBR Automotive Pty., Ltd., East Bentleigh, Australia

[21] Appl. No.: 793,473

[22] PCT Filed: Aug. 25, 1995

[86] PCT No.: PCT/AU95/00530

§ 371 Date: Feb. 26, 1997

§ 102(e) Date: Feb. 26, 1997

[87] PCT Pub. No.: WO96/07569

PCT Pub. Date: Mar. 14, 1996

[30] Foreign Application Priority Data

Sep. 2, 1994 [AU] Australia ............... PM 7846

[51] Int. Cl.[6] ............................................. G05G 5/06
[52] U.S. Cl. ..................... 74/535; 74/538; 74/533; 74/575; 74/577 R
[58] Field of Search ..................... 74/512, 513, 560, 74/531, 535, 575; 188/290, 291, 77 W, 271; 192/12 BA, 57

[56] References Cited

U.S. PATENT DOCUMENTS

| | | |
|---|---|---|
| 3,621,959 | 11/1971 | Gale et al. . |
| 4,138,905 | 2/1979 | Konishi . |
| 4,512,210 | 4/1985 | Gurney . |
| 4,515,036 | 5/1985 | Dotson . |
| 4,819,501 | 4/1989 | Kraus et al. . |
| 4,841,798 | 6/1989 | Porter et al. ............... 74/535 X |
| 4,854,187 | 8/1989 | Walters . |
| 5,001,942 | 3/1991 | Boyer . |
| 5,067,366 | 11/1991 | Gandiglio . |
| 5,205,184 | 4/1993 | Noel et al. ............... 74/538 |
| 5,272,935 | 12/1993 | Heinemann et al. . |
| 5,533,420 | 7/1996 | Perisho ............... 74/512 |

FOREIGN PATENT DOCUMENTS

| | | |
|---|---|---|
| 0317117A2 | 5/1989 | European Pat. Off. . |
| 0351131A2 | 1/1990 | European Pat. Off. . |
| 2514705 | 4/1983 | France . |
| 2582272A | 11/1986 | France . |
| 3820978A | 12/1989 | Germany . |
| 3900174A | 7/1990 | Germany . |
| 3900661A | 7/1990 | Germany . |
| 725385 | 3/1955 | United Kingdom ............... 74/535 |

*Primary Examiner*—Vinh T. Luong
*Attorney, Agent, or Firm*—Watson Cole Stevens Davis, P.L.L.C.

[57] ABSTRACT

A slack adjuster (1) for a cable operated system, such as a brake assembly operable by a brake lever (2), includes two drive parts (9) and (10) which are engageable to form a drive connection between the brake lever (2) and the cable (29) to enable the lever (2) to impart an actuating force to the cable 929) during movement of the lever (2) between a rest and a fully actuated position. The slack adjuster (1) further includes a pivotal lever (23) which is operable to disengage the drive parts (9) and (10) during a predetermined portion of one of either the applied or release strokes of the brake lever (2), but inoperative during other portions of the strokes, thereby enabling adjustment of slack in the cable (29) by movement of one drive (9, 10) relative to the other drive part (10, 9) to occur only during the one stroke.

25 Claims, 6 Drawing Sheets

CABLE SLACK ADJUSTER

BACKGROUND OF THE INVENTION

1. Field of the Invention

The present invention relates to automatic slack adjustment for systems involving the use of a cable for transferring an applied force between two parts of the system. An example system of that kind is a vehicle brake system in which the brake is controlled by a manually operable actuator connected to the brake assembly through a flexible cable. It will be convenient to hereinafter describe the invention with particular reference to that example, and it is to be understood that the invention has wider application.

2. Description of the Prior Art

In a vehicle brake system there needs to be a limit on the extent of actuator movement required to transfer the brake assembly between the brake fully-on and brake fully-off conditions. By way of example, excessive actuator movement can be dangerous because of the time required to fully apply the brakes in an emergency. Actuator movement will increase as a natural consequence of the brake friction lining wearing during use, and some form of cable slack adjustment is required to compensate for that wear and keep the actuator movement within reasonable limits.

One form of prior art cable slack adjuster incorporates two drive parts which forms a drive connection between the brake lever and the cable. One drive part comprises a pawl and the other drive part comprises a tensioning reel. The pawl is pivotally connected to the lever and is engagable with the tensioning reel, which is connected to the cable. The drive connection enables the lever to impart an actuating force to the cable during movement of the lever between a rest and a fully actuated position. The two drive parts are normally biased into engagement except at the rest position of the lever where the pawl is forced out of engagement from the reel, typically by engaging a stop secured to the support structure. Once disengaged, slack adjustment can occur through movement of the tensioning reel relative to the pawl, and typically this is achieved by a spring acting on the tensioning reel which biases the tensioning reel to rotate in a cable tensioning direction.

While a cable slack adjuster of this type is able to operate automatically, it is prone to malfunction because of its sensitivity to changes which naturally occur within the system under normal use conditions.

One particular problem is the tendency of the slack adjuster to over adjust, such that inadequate running clearance exists within the brake assembly when the brake actuator is at the rest position, or to under adjust such that insufficient slack is taken up. This can occur as the movement of the tensioning reel to take up slack in the cable is dependent on the relationship between competing forces acting on the reel. These competing forces are typically the loads imposed on the reel by the cable and the force imposed on the reel by the spring. As these forces may vary under continued use of the system, the adjuster can malfunction by the spring force becoming the two dominant force which will cause the adjuster to over adjust, or conversely becoming too weak relative to the cable tension which will result in the adjuster taking up insufficient slack.

Another problem is that the slack adjuster may malfunction through failure of the pawl to properly engage the tensioning reel. Typically the pawl includes at least one tooth which is engagable with a series of teeth located on the reel and failure is particularly prone to occur if the pawl teeth only partially engage with the reel teeth, which may cause the pawl teeth to fracture or slip out of engagement with the reel.

U.S. Pat. No. 4,819,501 to Kraus discloses a cable slack adjuster of the above type which aims to address the problem of over adjustment. The slack adjuster disclosed includes an arrangement which controls the amount of slack which is taken up through the positioning of a sliding pawl mounted to the reel. The position of the sliding pawl is dependent on the amount of movement of the lever in the applied stroke, and slack is taken up on return of the lever to the rest position through disengagement of the drive parts at that position. While the Kraus reference discloses an arrangement which addresses the problem of over adjustment, it does not deal with the problem of under adjustment nor the problem of the adjuster malfunctioning by the drive parts not properly engaging.

German patent application DE 3,900,661 to Ed Scharwächeter GmbH & Co. discloses an adjuster which incorporates a pawl which disengages the reel at a spaced distance from the rest position. The Scharwächeter reference discloses a pivotally mounted double pawl having a forward catch and a rearward catch. The forward catch engages the reel in the rest position and on movement of the lever in the applied stroke, the pawl undergoes a controlled movement through engagement with a cam surface, which moves the forward catch out of engagement with the reel, such that the pawl fully disengages the reel, and then on continued movement of the lever to the applied position, the pawl continues to move until the rearward catch engages the reel. The reverse action occurs on the release stroke as the pawl moves back across the cam surface to the rest position.

Similar to the Kraus reference, the Scharwächeter reference addresses the problem of over adjustment as cable slack is introduced into the system during the release stroke as the drive parts re-engage before the lever reaches the rest position. This slack is maintained in the system as the drive parts remain engaged when the lever is in the rest position. However the problem of malfunction of the slack adjuster through the failure of the drive parts to engage properly is exacerbated in the Scharwächeter reference as the pawl, in particular the rearward catch, is caused to engage the reel when the system is under high loading.

U.S. Pat. No. 5,001,942 to Boyer aims to address the problem of improving the engagement between the drive parts by enabling the pawl to move laterally relative to the reel into a nested position to fully engage the reel. In this nested position, the pawl is prevented from pivoting out of engagement from the reel. The problem with this arrangement is that the system is more complex and also does not address the problem of over or under adjustment of the adjuster.

SUMMARY OF THE INVENTION

An aim of the present invention is to provide a cable slack adjuster which has an improved disengagement arrangement for disengaging the drive parts to enable cable slack adjustment to occur. With this improved disengagement arrangement, in a preferred form, the adjuster is able to overcome or at least ameliorate the problems of incorrect slack adjustment and malfunction of the adjuster by failure of the drive parts to properly engage.

Accordingly, the present invention provides a slack adjuster for a cable operated system including two cooperable drive parts, one of which is connectable to a movable member of the system and the other is connectable to the cable, the drive parts being engagable to form a drive connection between the movable member and the cable, the movable member being movable in one direction from a rest position to a fully actuated position to perform an applied stroke and being movable in the opposite direction from the fully actuated position to perform a release stroke, the drive connection enabling the movable member to impart an actuating force to the cable during movement through a said stroke, and drive disengaging means operable during a predetermined portion of one stroke to cause the two drive parts to disengage and thereby permit adjustment of slack in the cable to occur through movement of one drive part relative to the other, wherein the predetermined portion is in spaced relationship to the rest position and the drive disengaging means is inoperative to disengage the drive parts during other portions of the strokes such that operation of the drive disengaging means enables adjustment of slack in the cable to occur only during the one stroke within the predetermined portion.

It is a feature of the adjuster that disengagement of the drive connection will always occur during normal operation of the movable member at a spaced location from the rest position. However the disengagement is only temporary and occurs in only one of the applied or release strokes. The temporary disengagement simply conditions the system to permit adjustment of cable slack. Such adjustment may or may not occur accordingly to whether or not justification for the adjustment exists. In a preferred form of the invention, the adjuster is force responsive in that tension in the connected cable largely determines whether or not adjustment occurs.

With the disengaging means, it is possible to design a system in which slack adjustment occurs at a predetermined portion during operation of the system, and in which the duration of the adjustment stage can be selected to suit particular requirements. That facility to determine the position and extent of movement of the movable member when the parts are disengaged enables the efficiency of the slack adjuster to be maximised and also enables compatibility with other aspects of the system to be maximised.

As the predetermined portion where the drive disengaging means is operable is spaced from the rest position, slack is automatically introduced into the system after slack adjustment has taken place when the drive parts re-engage and the lever is moved to the rest position. In this way, the adjuster can be arranged to ensure that it does not over adjust. Further, it is preferable that the disengaging means is operable only during the release stroke. By being operable only on the release stroke, the drive parts remain in engagement during the applied stroke where the system is under higher loading and only disengage during the release stroke when the loading is reducing. With this arrangement it is less likely that the adjuster will malfunction by the drive parts failing to engage properly.

Preferably the adjuster includes tensioning means which are adapted to apply a biasing force which is greater than the threshold loading required in the cable to operate the system, such that all the slack in the system is taken up during disengagement of the drive parts. This arrangement ensures that the slack adjuster is operable to take up sufficient slack. However, it does not cause the problem of inadequate running clearance as would occur in many prior art adjusters as it will not over adjust the system because a predetermined amount of slack is reintroduced into the system after slack adjustment has taken place.

In an example application of the invention, the aforementioned movable member is a pivoted hand operated lever of a vehicle brake system. An embodiment of the invention which is applicable to that example is generally constructed as follows.

One part of the drive connection is a wheel-like member which is rotatable about an axis substantially coincident with the pivot axis of the brake lever, and which has a series of teeth provided along an outer surface. In use, a cable which connects the brake lever to the brake assembly has one end attached to the wheel-like member at a location radially outwards of the rotational axis. The other drive part is a pawl which is engagable with at least one tooth of the aforementioned series of teeth and which is connected to the brake lever so as to move with that lever. Biasing means normally urges the pawl into engagement with the wheel-like member, and the same or separate biasing means urges the wheel-like member to rotate in a cable tensioning direction.

It is preferred that the pawl is pivotally mounted on the brake lever so as to be movable towards and away from engagement with the teeth of the wheel-like member.

The drive disengaging means may include a cam device which is supported independently of both the wheel-like member and the brake lever and is operable to disengage the two drive parts by applying a disengaging force to the pawl. Preferably the disengaging means is engagable with a first abutment surface on the pawl to apply a disengaging force to the pawl by movement of the first abutment surface across the disengaging means during the predetermined part of the release stroke.

Preferably the drive disengaging means is also engagable with the pawl during the other stroke but includes means to ensure that the drive disengaging means remains inoperative during the other stroke. In a preferred arrangement, these means include the facility for the drive disengaging means to move relative to the pawl between an operative and an inoperative position. With this arrangement, during the other stroke, the drive disengaging means is adapted to engage a second abutment surface of the pawl which causes the drive disengaging means to move from the operative position towards the inoperative position wherein it is inoperative to disengage the drive parts.

The invention will be hereinafter described in greater detail by referenced to the accompanying drawings which show an example embodiment of the invention applied to one form of brake actuator. The particularity of those drawings and the related description is not to be understood as superseding the generality of the preceding broad description of the invention.

DESCRIPTION OF THE PREFERRED EMBODIMENTS

Figure 1:
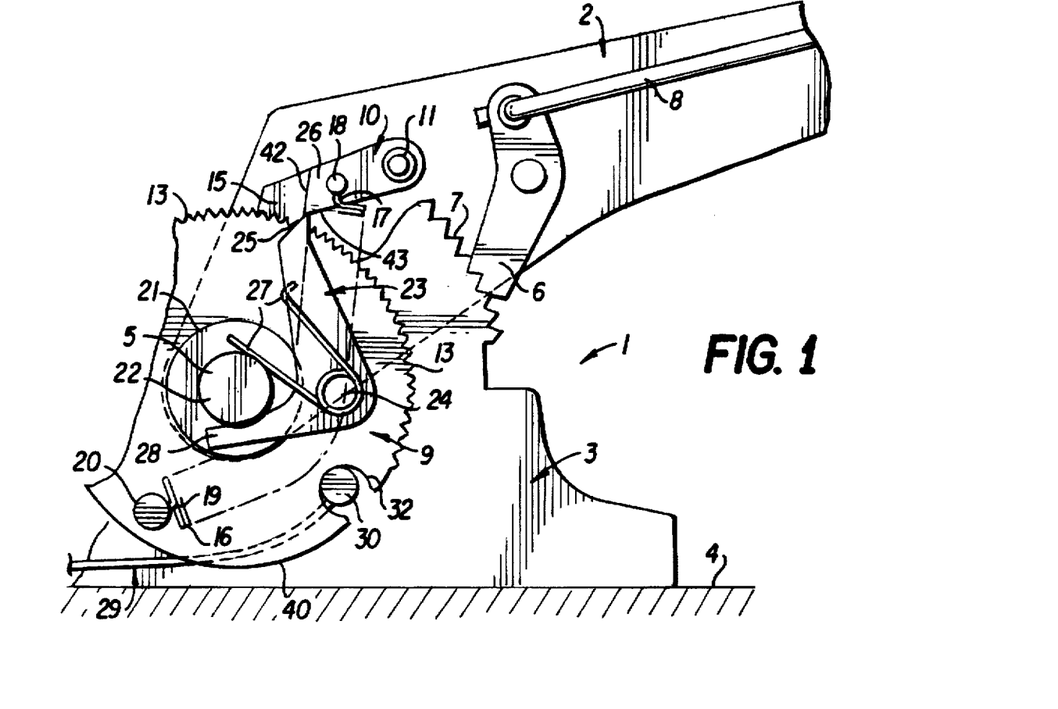
FIG. 1 shows in semi-diagrammatic form an actuator assembly including a cable slack adjuster according to a first embodiment of the invention for use in a vehicle park brake system.
Figure 2:
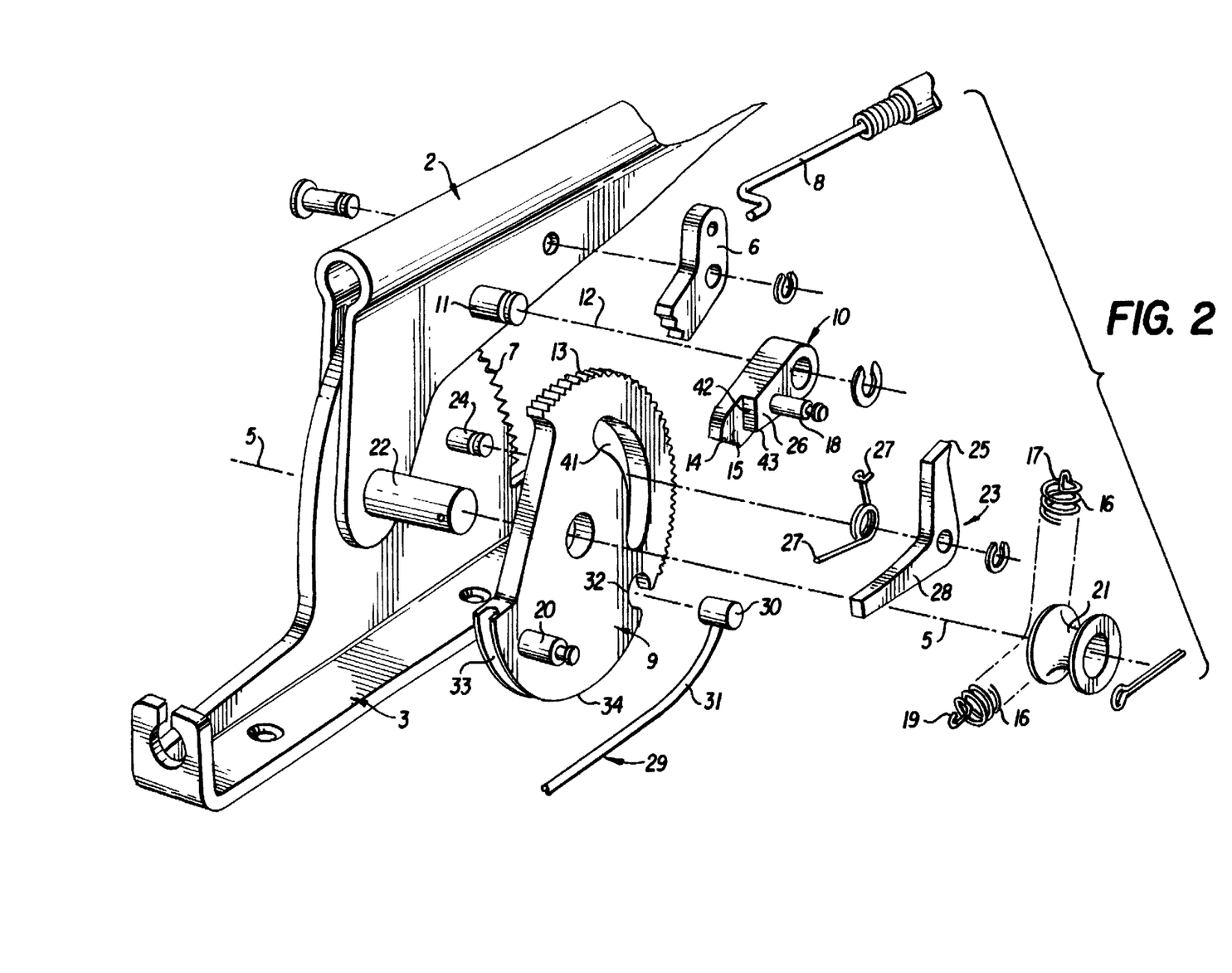
FIG. 2 is an exploded view of the assembly of FIG. 1.

As illustrated in FIGS. 1 and 2, an actuator assembly 1 is disclosed in which the movable and force initiating member of the assembly is a hand engagable lever 2 which is pivotally connected to a mounting 3 secured to a support 4. The pivotal axis of the lever 2 is indicated by the reference numeral 5. Pivotal movement of the lever 2 in the anti-clockwise direction corresponds to brake apply movement, and pivotal movement in the reverse direction corresponds to brake release movement. A locking pawl 6 is engagable with ratchet teeth 7 on the mounting 3 so as to hold the lever 2 in a selected position, and the pawl 6 is preferably arranged so as to automatically disengage from and ride over the teeth 7 during the brake applied stroke of the lever 2. Any suitable means 8 (shown in part only) can be provided to enable selective release of the pawl 6 from the teeth 7 when brake release movement of the lever 2 is required.

It is to be understood that the invention is applicable to assemblies other than that shown in FIGS. 1 and 2. By way of example, the brake actuator could be a handle arranged for linear movement rather than a lever arranged for a pivotal movement or could be employed in a foot actuated brake arrangement.

In the particular arrangement shown, the two parts of the disengagable drive connection are formed by a wheel 9 and a cooperable pawl 10. The wheel 9 is arranged for rotation about the axis 5, or another axis substantially coincident therewith, and is rotatable relative to both the lever 2 and the mounting 3. It is to be understood that it is not essential for the rotational axis of the wheel 9 to be coincident with the axis 5, but it is generally required that the two axes be substantially parallel. The pawl 10 is carried by the lever 2 so as to move with that lever, and in the arrangement shown is connected to the lever 2 through a pin 11 so as to permit the pawl 10 to pivot relative to the lever 2. The pin 11 is arranged so that the pivotal axis 12 (FIG. 2) of the pawl 10 is substantially parallel to the pivotal axis 5 of the lever 2.

Co-operative engagement between the wheel 9 and the pawl 10 can be achieved in any suitable manner. In the particular arrangement shown that engagement is effected between co-operable teeth of the wheel 9 and the pawl 10 respectively. It is preferred that the wheel 9 is provided with a series of relatively fine teeth 13 arranged along an arcuate outer surface of the wheel 9. It is further preferred that the arc along which the teeth are formed has its centre substantially coincident with the rotational axis of the wheel 9. A series of a smaller number of co-operable teeth 14 is provided on an end 15 of the pawl 10 which is adjacent to the wheel 9.

Biasing means acts on the pawl 10 so as to normally urge the pawl end 15 towards the wheel 9 so as to thereby keep the teeth 13 and 14 in co-operative engagement. In the particular arrangement shown, that biasing means includes a helical tension spring 16 having one end 17 connected to the pawl 10 through a pin 18 extending laterally from the body of the pawl 10. The other end 19 of the spring 16 is attached to a support such as to cause the spring 16 to normally pull the pawl end 15 against the outer toothed surface of the wheel 9.

It is also preferred to bias the wheel 9 to rotate in a cable tensioning direction, which is anti-clockwise in the arrangement of FIGS. 1 and 2. The biasing spring 16 may be conveniently used for that purpose as shown in FIG. 1. That is, the spring end 19 is attached to the wheel 9 through a laterally projecting pin 20 secured to the wheel 9 at a location spaced radially outwards of the axis 5. In the arrangement shown, the spring 16 engages against and bends around a roller 21 mounted on an axle 22 which rotatably supports the wheel 9. Other arrangements are clearly possible. In particular, biasing means for the wheel 9 can be arranged independent of the biasing means for the pawl 10.

In the illustrated arrangement, the strength of the biasing spring 16 is arranged to be greater than the threshold loading in the cable required to operate the brake assembly even to the extent as to partially apply the brakes. This arrangement ensures that all the slack is taken up in the cable, and may even include the shoe to drum running clearance in a drum brake assembly, on disengagement of the drive parts as is hereafter described. However it should be appreciated that the strength of the spring may be varied and in particular, may be less than the threshold loading in the system, to suit particular requirements.

The pawl 10 and the wheel 9 are relatively arranged so that the pawl 10 will transmit drive from the lever 2 to the wheel 9 regardless of the direction of rotation of the lever 2, but subject to the pawl teeth 14 remaining in engagement with the wheel teeth 13. In particular, the arrangement is such that there is no tendency for the pawl 10 to ratchet out of engagement with the wheel 9 in either direction of pivotal movement of the lever 2. The tendency for the pawl to ratchet out of engagement is dependent on the loading acting on the pawl which is in the radial direction. This loading is made up from the biasing means which biases the pawl into engagement with the wheel, and a component of the force of the biasing spring 16 which acts as in a direction radially outwardly from the pawl. As the biasing spring 16 is primarily designed to cause the wheel to rotate relative to the pawl 16, only a component of the force of the biasing spring will act in a radially outwardly direction and this will be dependent on the shape of the respective teeth 13 and 14. Consequently it is an advantage that the biasing spring 16 also is arranged to bias the pawl into engagement with the wheel as this arrangement will ensure that biasing spring 16 does not impart a net force on the pawl which will ratchet it out of engagement with the wheel. It is also preferred that the arrangement is such that in the event of the pawl 10 disengaging from the wheel 9 there is an absence of camming influence between the teeth 13 and 14 respectively which would cause relative rotation of the wheel 9.

Any suitable means may be adopted to cause temporary disengagement of the pawl 10 and the wheel 9 for the purpose previously referred to. In the arrangement shown, that means includes a camming device 23 which is capable of movement between operative and inoperative conditions as hereinafter described. The camming device is pivotally connected to the mounting 3 through a pivot pin 24 and has a cam head 25 arranged for co-operative engagement with a laterally extending portion 26 of the pawl 10. The cam head 25 and the pawl portion 26 are relatively arranged so as to achieve a particular result as hereinafter described. Although the camming device 23 is shown and described as being connected to the mounting 3, it could be connected to any other suitable support.

The camming device 23 is pivotally mounted on the pin 24 so as to be movable between the operative and inoperative positions of the device 23. In the arrangement shown, a biasing spring 27 functions to normally urge the device 23 into the operative position as shown in FIG. 1, and stop means may be provided to prevent movement of the device 23 beyond that operative position. The stop means may include a laterally projecting tail 28 as shown, which is engagable against the axle 22 or another relatively fixed surface.

A flexible cable 29 can be connected to the wheel 9 in any suitable fashion. In the arrangement shown, that connection is effected through a cylindrical ferrule 30 secured to an end 31 of the cable 29 and rotatably located in a complementary pocket 32 provided in the outer portion of the wheel 9. A groove 33 may be formed in a radially outer surface 40 of the wheel 9 so as to retain the cable 29 in proper position relative to the wheel 9.

In the particular arrangement shown in the drawings, the wheel 9 is interposed between the lever 2 and the camming device 23. As a result, the pivot pin 24 of the camming device 23 projects through an opening formed through the wheel 9, which in the arrangement shown is a slot 41 arranged to permit the necessary relative movement between the wheel 9 and the pin 24. It is to be understood that an opening having a different configuration could be adopted.

Figure 3:
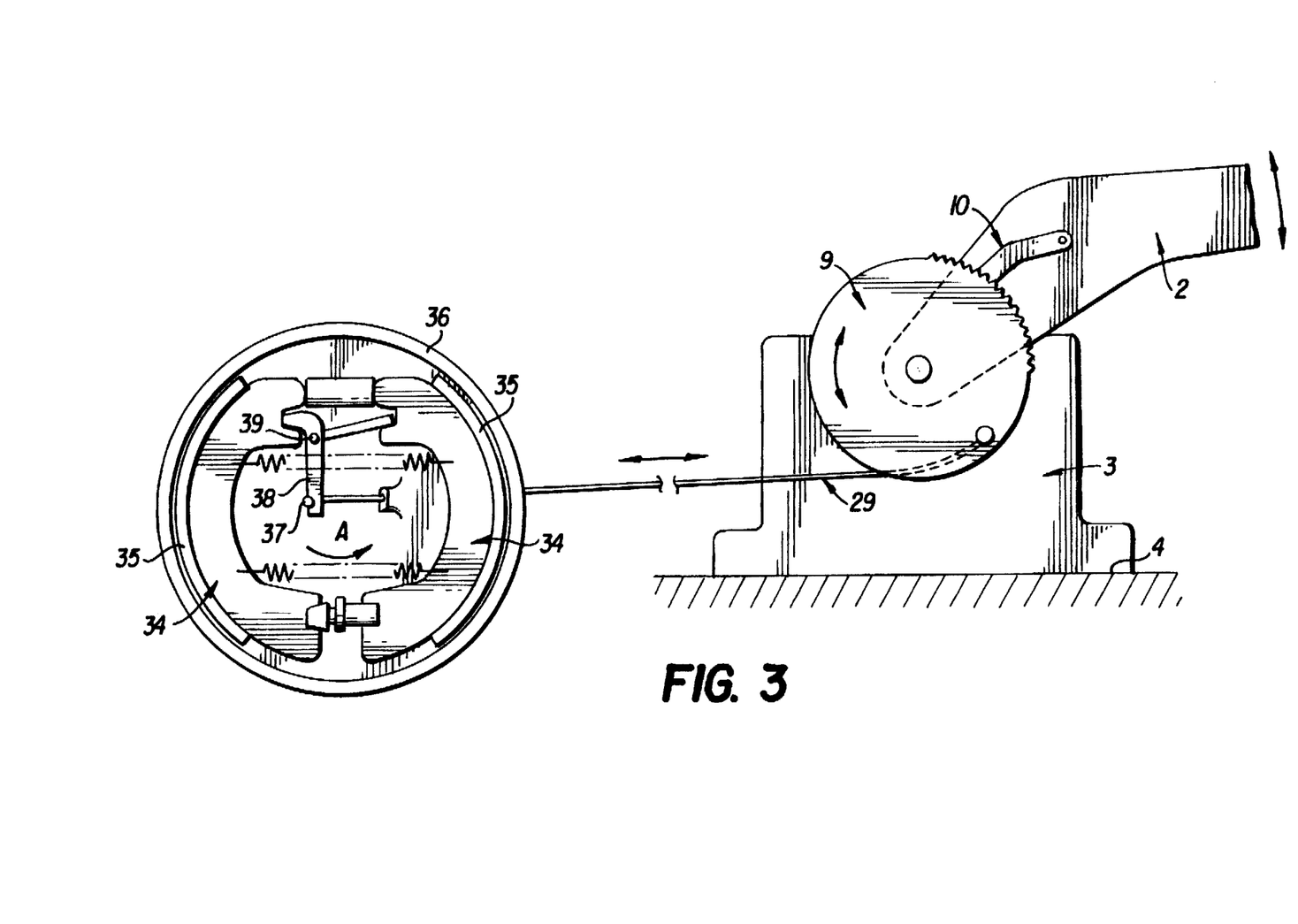
FIG. 3 shows in diagrammatic form the connection of the cable of the assembly of FIG. 1 with a brake assembly.

FIG. 3 shows in diagrammatic form the connection of the cable 29 with a brake assembly, which in the example shown is a drum brake assembly. A brake shoe 34 having friction lining 35 attached is located within a rotatable drum 36, and an end 37 of the cable 29 is attached to a lever 38 arranged to swing about a pivot 39. When the lever 38 is pivoted in the direction of arrow A, it reacts with the shoe 34 so as to cause radial expansion of the shoe 34 and thereby cause application of the brake. It is to be understood that the invention can be used with a brake assembly other than that shown in FIG. 3.

Operation of the arrangement shown and described is as follows.

Figure 4:
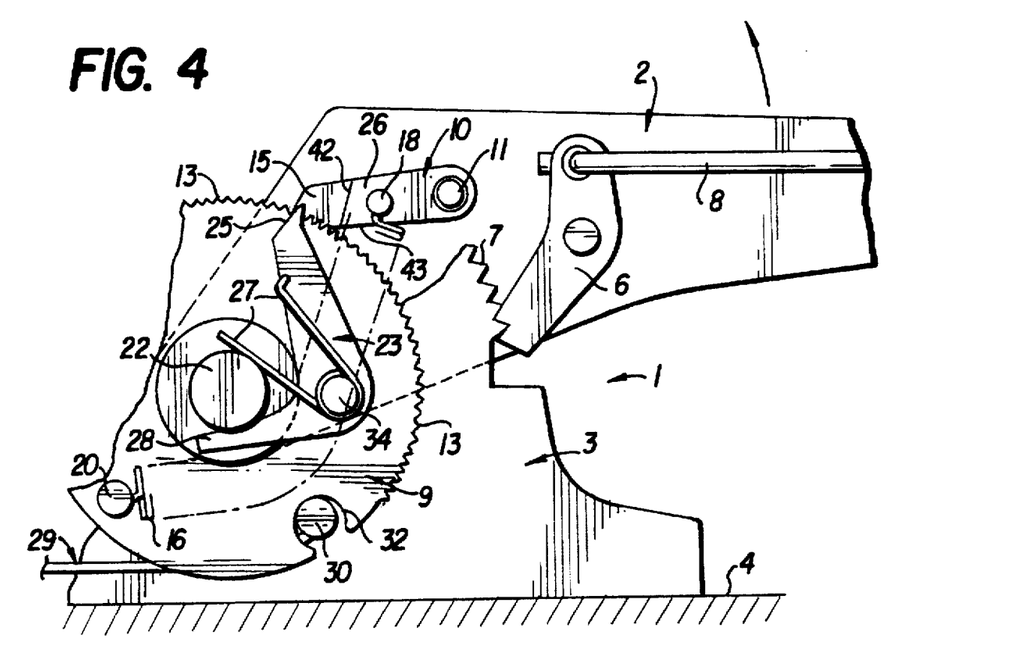
FIG. 4 shows the assembly of FIG. 1 with the lever in the rest position.
Figure 5:
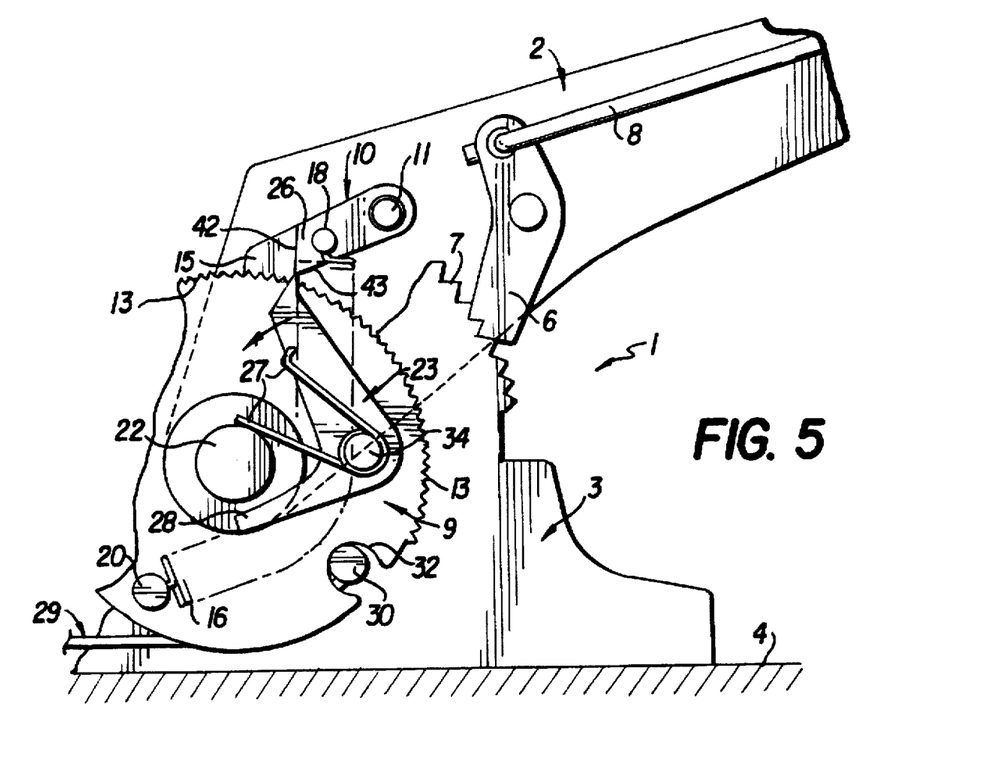
FIG. 5 shows the assembly of FIG. 1 with the lever part way through the applied stroke.

When the brake is at the fully-off position, the lever 2 will be positioned roughly as shown in FIG. 4. In that position, the laterally extending portion 26 of the pawl 10 is positioned below and to the right of the head 25 of the camming device 23. The pawl 10 and the wheel 9 are in engagement so that the wheel 9 will rotate anti-clockwise in response to pivotal movement of the lever 2 in the anti-clockwise direction. In the course of that pivotal movement, the surface 42 of the pawl portion 26 engages the head 25 of the camming device 23 and thereby causes the device 23 to deflect anti-clockwise about the pivot pin 24 to adopt an inoperative position such that the pawl 10 is not influenced out of engagement with the wheel 9. That deflection and the inoperative position of the camming device 23 are shown in FIG. 5.

Movement of the camming device 23 into the inoperative position is made possible by partial collapse of the spring 27. When the lever 2 has been pivoted to the position shown in FIG. 1, or beyond, the spring 27 functions to return the camming device 23 to the operative position shown in FIGS. 1 and 4.

It follows that the wheel 9 moves anti-clockwise with the lever 2 without interruption. That is, the drive connection between the lever 2 and the wheel 9 remains intact at all times. As a consequence, the wheel 9 pulls the cable 29 away from the brake assembly (FIG. 3) and thereby causes the brake to be applied in a progressive manner. Since there is no change in the relative positions of the pawl 10 and the wheel 9 during the brake applying stage, the tension in the spring 16 remains substantially unchanged. In particular, the spring 16 continues to urge the pawl 10 into engagement with the wheel 9 and also continues to urge the wheel 9 to rotate in the anti-clockwise direction.

Figure 6:
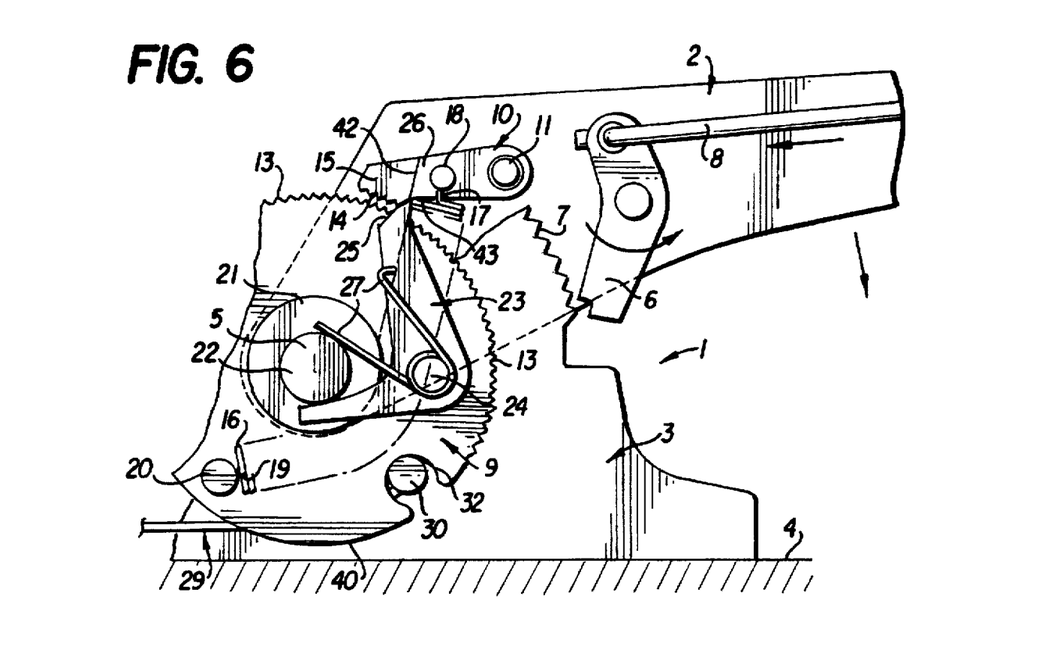
FIG. 6 shows the assembly of FIG. 1 with the lever during the predetermined part in the release stroke with the drive parts disengaged.

When it is desired to release the brake, the lever 2 is caused to move in the clockwise direction as represented by the arrow in FIG. 6. At a particular stage of that movement the surface 43 of the pawl portion 26 engages the head 25 of the camming device 23. As a consequence of that engagement the pawl 10 is carried out of engagement with the wheel 9, and that disengagement continues until the pawl surface 42 is positioned to the right of the head 25 of the camming device 23. The pawl 10 is then able to move back into engagement with the wheel 9 under the influence of the spring 16.

On disengagement of the pawl from the wheel 9 the wheel is able to move relative to the pawl under the influence of the biasing spring 16 in a cable tensioning direction. Because the biasing spring 16 is adapted to be greater than the threshold loading required to operate the system, any slack in the system is adapted to be taken up on disengagement of the drive parts. Once the pawl 10 re-engages with the wheel 9, continued movement of the lever 2 to the rest position causes slack to be fed into the cable. This ensures that once the lever is in the rest position, there is sufficient slack in the cable to ensure that there is adequate running clearance in the brake assembly.

Adjustment of cable slack will only occur while the pawl 10 and the wheel 9 are disengaged as described above. Before and following that disengagement the pawl 10 and the wheel 9 co-operate to form a complete uninterrupted drive connection between the lever 2 and the wheel 9. In that regard, the camming device 23 retains a fixed position relative to the mounting 3 during brake release movement of the lever 2 and the wheel 9. It is therefore possible to arrange the device 23 so that it causes temporary disengagement of the pawl 10 and the wheel 9 at any desired stage of the brake release stroke. In particular the amount of slack which is introduced into the system once the lever 2 has returned to the rest position can be controlled by the location that the pawl 10 re-engages the wheel 9 during the release stroke. Furthermore, the camming device 23 and the pawl 10 can be constructed and/or relatively arranged so that 20 the duration of the temporary disengagement is determined to suit particular requirements.

Adjustment will not occur each time the drive connection is broken. It will occur only in circumstances where the spring 16 imposes a turning force on the wheel 9 which exceeds the oppositely acting restraining force imposed on the wheel 9 by the tension in the cable 29. Those forces will be substantially balanced when the brake is in its initial unworn condition as the cable will at the threshold loading of the system when the drive parts disengage. As wear of the friction lining 35 progresses however, the brake lever 38 is able to move further to the right of FIG. 3 and tension in the cable 29 reduces accordingly. A situation thereby develops at which the force imposed by the spring 16 becomes so dominant that it causes the wheel 9 to rotate anti-clockwise relative to the lever 2 during the period of disengagement of the pawl 10 and the wheel 9. That relative rotation takes-up slack in the cable 29 so as to keep the range of movement of the lever 2 within acceptable limits.

It is to be understood that it is not essential for the slack adjustment to occur during brake release movement of the lever 2. If desired, the system could be arranged to cause the adjustment to occur during brake applying movement of the lever 2. Nevertheless, the particular arrangement shown and described has the advantage that the co-operating components are subjected to reducing rather than increasing stress at the time of the adjustment, and as a consequence there is less likelihood of components being damaged in the course of the adjustment.

Figure 7:
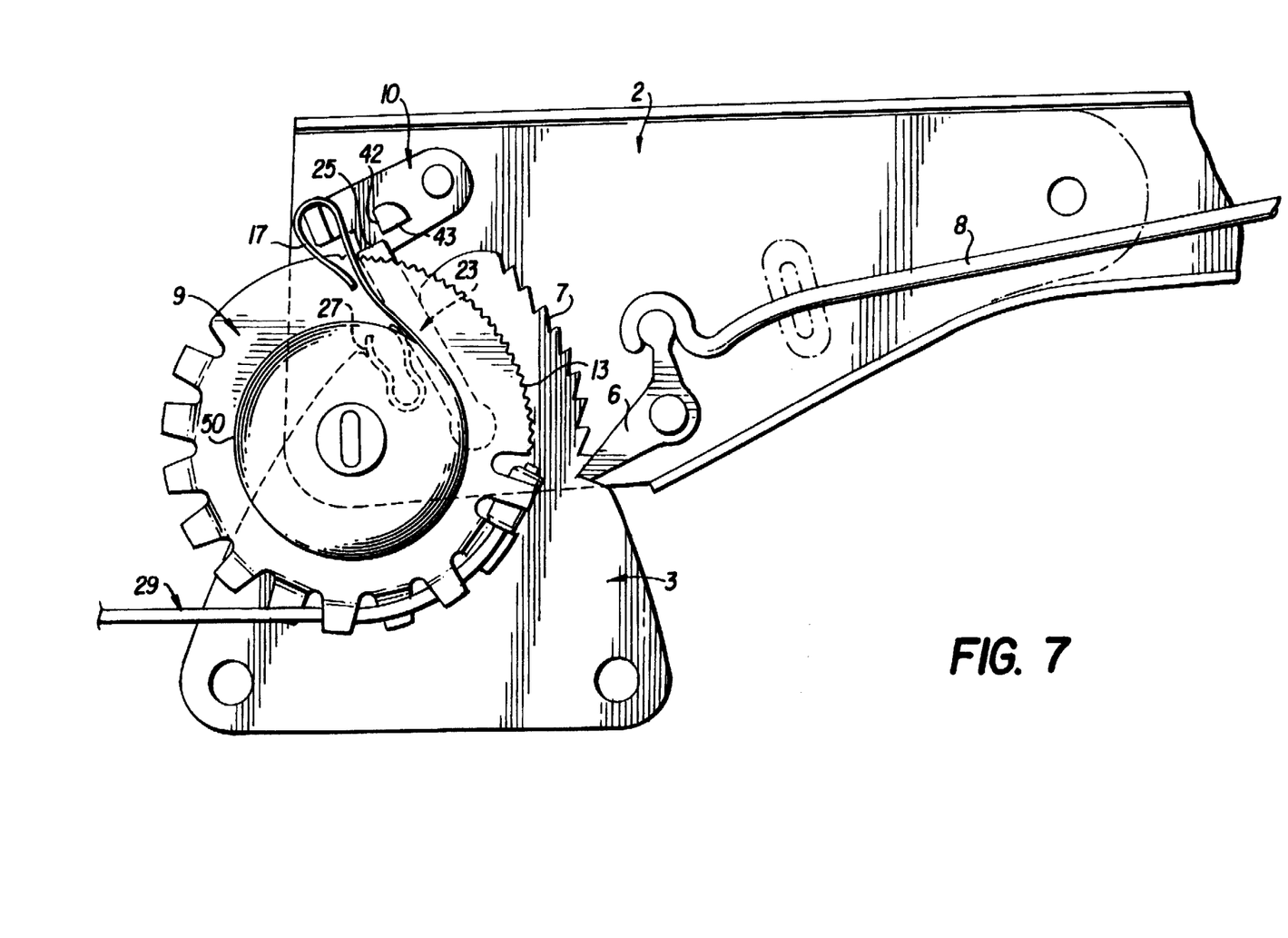
FIG. 7 shows a variation of the actuator assembly of FIG. 1.
Figure 8:
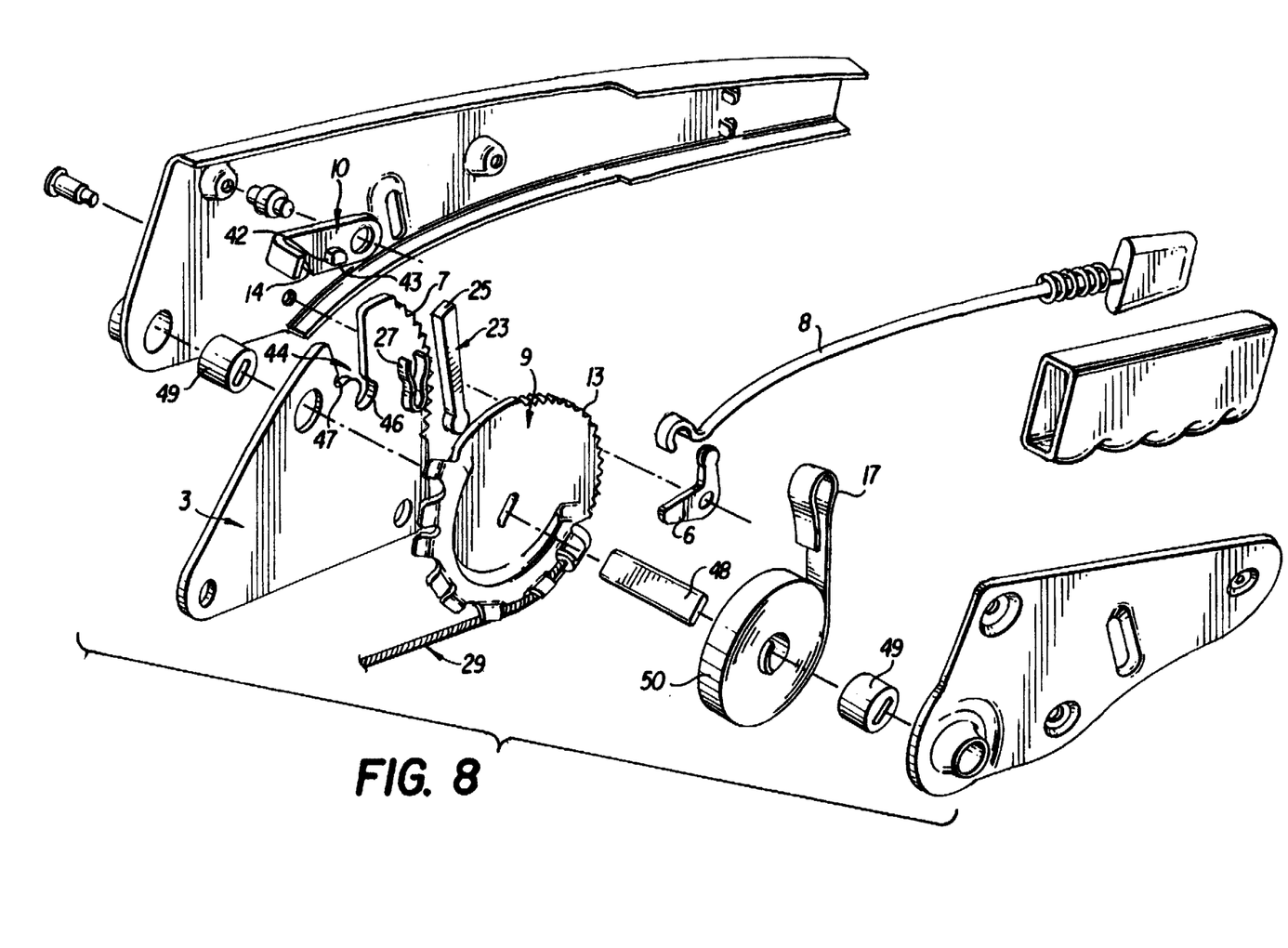
FIG. 8 is an exploded view of the assembly of FIG. 7.

A second embodiment of the brake actuator 1 is illustrated in FIGS. 7 and 8. This embodiment is similar to the first embodiment and like features have been given like reference numerals.

The primary difference in the second embodiment relates to the location of the camming device 23. In the second embodiment, the camming device is located within a recess 44 formed in the mounting 3. The recess incorporates a part circular bearing surface 45 in which a complementary bearing surface 46 of the camming device 23 is adapted to be located to enable the device 23 to pivot between its operative and inoperative positions.

The recess 44 includes a further portion 47 which is adapted to receive the biasing spring 27 to bias the camming device into the operative position. In the illustrated arrangement, the biasing spring 27 is in the form of a leaf spring.

A further difference in the second embodiment is that the biasing spring which is adapted to bias the wheel 9 in the cable tensioning direction is in the form of a clock spring 50. In this arrangement, the clock spring 50 is keyed to the wheel 9 by a non-circular shaft 48 to impart the biasing force to the wheel. Bearing elements 49 are located on opposite ends of the shaft 48 to enable the spring and wheel to rotate relative to the lever 2 and the pawl 10.

While the actuator 2 of the second embodiment operates in the same manner as the earlier embodiment, the arrangement of the camming device 23 and the clock spring 16 simplifies the manufacture of the actuator and provides for a more compact design.

A slack adjuster according to the invention has a number of advantages including simplicity of construction and efficient operation. A particular advantage is the ability to select the stage in the operation of the total system at which slack adjustment will occur, and the further ability to select the duration of time or movement over which the adjustment can take place. The adjuster is essentially force responsive in that adjustment will not occur without a suitable imbalance of counteracting forces, but it is also position dependent in that the system can be arranged to enable the adjustment to occur only during the time period at which certain components of the system have a particular positional relationship.

Finally, it is to be understood that various alterations, modifications and/or additions may be introduced into the constructions and arrangements of parts previously described without departing from the spirit or ambit of the invention.

I claim:

1. A cable actuating system including:

an actuator which is movable in one direction away from a rest position to perform an applied stroke and is movable in an opposite direction towards said rest position to perform a release stroke;

a cable;

a cable slack adjuster including a first drive part which is connected to said actuator and a second drive part which is connected to said cable, said drive parts being releasably retained in co-operative engagement and being restrained against relative movement in either of said directions when in said co-operative engagement, said co-operatively engaging drive parts forming a drive connection between said actuator and said cable whereby said actuator is operable to cause longitudinal movement of said cable during said applied stroke, one of said drive parts including first and second engagement surfaces;

a camming device movable between an operative position and an inoperative position during said applied stroke and which retains said operative position during a predetermined portion of said release stroke so as to thereby release said drive parts from said co-operative engagement, said predetermined portion being spaced from said rest position and said drive parts being operative to re-engage in said co-operative engagement during said release stroke before said rest position;

a biasing spring which biases said camming device into said operative position; and tensioning means operative to move said second drive part in said one direction relative to said first drive part when said drive parts are released from said co-operative engagement and thereby tension said cable;

wherein during said predetermined portion of said release stroke, said camming device engages said first engagement surface and thereby causes said drive parts to move out of co-operative engagement, and during said applied stroke, said camming device engages said second engagement surface and is thereby caused to move into said inoperative position at which said camming device is unable to cause release of said co-operative engagement.

2. A cable actuating system according to claim 1, wherein said engagement surfaces are provided on said first drive part.

3. A cable actuating system including;

a mounting;

an actuator which is movable relative to the mounting in one direction away from a rest position to perform an applied stroke and is movable in an opposite direction towards said rest position to perform a release stroke;

a cable;

a cable slack adjuster including a pawl which is connected to said actuator, and a wheel member rotatably mounted to said mounting, the cable being connected to said wheel member at a location radially outwards of the rotational axis of the wheel member, the wheel member including a series of teeth provided along an arcuate outer edge thereof, the pawl and the wheel member being releasably retained in co-operative engagement with the pawl engaging at least one tooth of said series of teeth and are thereby restrained against relative movement in either of said directions, said co-operatively engaging pawl and wheel member forming a drive connection between said actuator and said cable whereby said actuator is operable to cause longitudinal movement of said cable during said applied stroke;

disengaging means which is operative during a predetermined portion of said release stroke to release said pawl and wheel member from said co-operative engagement, said predetermined portion being spaced from said rest position; and said drive parts being operative to re-engage in said co-operative engagement during said release stroke before said rest position; and a tensioning spring having a first end connected to the wheel member and a second end connected to the pawl, and which is operative to move said wheel member in said one direction relative to said pawl when said drive parts are released from said co-operative engagement and thereby tension said cable.

4. A cable actuating system according to claim 3, wherein the tensioning spring is in the form of a clock spring with the first end thereof affixed to the wheel member adjacent the rotational axis of said wheel member.

5. A cable actuating system including;

a mounting;

an actuator which is movable relative to the mounting in one direction away from a rest position to perform an applied stroke and is movable in an opposite direction towards said rest position to perform a release stroke;

a cable;

a cable slack adjuster including a pawl which is connected to said actuator, and a wheel member rotatably mounted to said mounting, the cable being connected to said wheel member at a location radially outwards of the rotational axis of the wheel member, the wheel member including a series of teeth provided along an arcuate outer edge thereof; the pawl and the wheel member being releasably retained in co-operative engagement with the pawl engaging at least one tooth of said series of teeth and thereby restrained against relative movement in either of said directions, said co-operatively engaging pawl and wheel member forming a drive connection between said actuator and said cable whereby said actuator is operable to cause longitudinal movement of said cable during said applied stroke;

a camming device which is pivotally connected to the mounting for movement from an operative position to an inoperative position during said applied stroke and which retains said operative position during a predetermined portion of said release stroke so as to be operative to release said pawl and the wheel member from said co-operative engagement, said predetermined portion being spaced from said rest position and said drive parts being operative to re-engage in said co-operative engagement during said release portion before said rest position; and tensioning means operative to move said wheel member in said one direction relative to said pawl when said drive parts are released from said co-operative engagement and thereby tension said cable.

6. A cable actuating system according to claim 5, wherein the camming device is pivotal about an axis which is substantially parallel to the rotational axis of the wheel member.

7. A cable actuating system according to claim 5, wherein the camming device is mounted within a recess formed in the mounting.

8. A cable actuating system according to claim 5, wherein a biasing spring biases said camming device into said operative position at which the camming device engages said pawl during a portion of each of said strokes, wherein during said predetermined portion of said release stroke, said camming device engages said pawl and thereby causes said pawl to move out of co-operative engagement with said wheel member, and wherein during said applied stroke, said engagement of said camming device with said pawl causes said camming device to move into said inoperative position at which said camming device is unable to cause release of said co-operative engagement.

9. A cable actuating system according to claim 8, wherein said pawl includes a first engagement surface which is engaged by said camming device during said release stroke so as to cause the pawl to move out of the co-operative engagement with the wheel member, and a second engagement surface which is engaged by said camming device during said applied stroke so as to cause said camming device to move into said inoperative position.

10. A cable actuating system including:

an actuator which is movable in one direction away from a rest position to perform an applied stroke and is movable in an opposite direction towards said rest position to perform a release stroke;

a cable;

a cable slack adjuster including a first drive part which is connected to said actuator and a second drive part which is connected to said cable, said drive parts being releasably retained in co-operative engagement and being restrained against relative movement in either of said directions when in said co-operative engagement, said co-operatively engaging drive parts forming a drive connection between said actuator and said cable whereby said actuator is operable to cause longitudinal movement of said cable during said applied stroke;

disengaging means which is operative during a predetermined portion of said release stroke to release said drive parts from said co-operative engagement, said predetermined portion being spaced from said rest position and said drive parts being operative to re-engage in said co-operative engagement during said release stroke before said rest position; and tensioning means operative to move said second drive part in said one direction relative to said first drive part when said drive parts are released from said co-operative engagement and thereby tension said cable.

11. A cable actuating system according to claim 10, wherein the disengaging means includes a camming device which engages one of said drive parts during said predetermined portion of the release stroke and thereby moves said drive parts out of co-operative engagement.

12. A cable actuating system according to claim 11, wherein said camming device is movable between an operative position and an inoperative position, a biasing spring biases said camming device into said operative position at which the camming device is engageable with said one drive part, and cam means operates to move said camming device into the inoperative position during at least a portion of said applied stroke to thereby prevent said camming device causing release of said co-operative engagement during said applied stroke.

13. A cable actuating system according to claim 12, wherein the cam means includes a surface of the camming device and a surface of the one drive part which engage and thereby impose a reactive force on the camming device such that the camming device is caused to move into said inoperative position.

14. A cable actuating system according to claim 10, further including a mounting, and wherein the second drive part includes a wheel member rotatably connected to said mounting, the cable being connected to said wheel member at a location radially outwards of the rotational axis of the wheel member.

15. A cable actuating system according to claim 14, wherein the first drive part comprises a pawl connected to said actuator, and wherein the wheel member includes a series of teeth provided along an actuate outer edge thereof and wherein the pawl is engageable with at least one tooth of said series of teeth.

16. A cable actuating system according to claim 15, wherein the tensioning means comprises a spring having a first end connected to the wheel member and a second end connected to the pawl.

17. A cable actuating system according to claim 15, wherein the tensioning means imparts a force to the pawl through the engagement of the pawl with the teeth of the wheel member, and wherein the component of the force imparted by the tensioning means on the pawl which acts in a direction radially outwards relative to the wheel is less than the force biasing the drive parts into co-operative engagement such that there is no tendency for the pawl to ratchet out of engagement with the wheel.

18. A cable actuating system according to claim 14, wherein the camming device is pivotally connected to the mounting to be movable between the operative and the inoperative positions.

19. A cable actuating system according to claim 15, wherein the pawl is pivotally connected to the actuator and is movable about an axis which is parallel to the rotational axis of the wheel member.

20. A cable actuating system according to claim 14, wherein the actuator is pivotally connected to the mounting and is rotatable about an axis which is coincident to the rotational axis of said wheel member.

21. A cable actuating system according to claim 14, wherein the actuator is pivotally mounted to the mounting and is rotatable about an axis which is parallel to the rotational axis of said wheel.

22. A cable actuating system according to claim 10, wherein the cable is connected to a brake system and on actuation of said brake system by said cable actuating system, a threshold loading is imparted to the cable resisting longitudinal movement of said cable, and wherein the force applied by the tensioning means to the second drive part is greater than said threshold loading.

23. A cable actuating system including:
  an actuator which is movable in one direction away from a rest position to perform an applied stroke and is movable in an opposite direction towards said rest position to perform a release stroke;
  a cable;
  a cable slack adjuster including a first drive part which is connected to said actuator and a second drive part which is connected to said cable, said drive parts being releasably retained in co-operative engagement and being restrained against relative movement in either of said directions when in said co-operative engagement, said co-operatively engaging drive parts forming a drive connection between said actuator and said cable whereby said actuator is operable to cause longitudinal movement of said cable during said applied stroke;
  disengaging means which is movable from an operative position to an inoperative position during said applied stroke and which retains said operative position during a predetermined portion of said release stroke so as to be operative to release said drive parts from said co-operative engagement, said predetermined portion being spaced from said rest position and said drive parts being operative to re-engage in said co-operative engagement during said release stroke before said rest position; and
  tensioning means operative to move said second drive part in said one direction relative to said first drive part when said drive parts are released from said co-operative engagement and thereby tension said cable.

24. A cable actuating system according to claim 23, wherein the disengaging means comprises a camming device, a biasing spring biases said camming device into said operative position at which the camming device engages with one of said drive parts during a portion of each of said strokes, wherein during the predetermined portion of said release stroke, said camming device engages said one drive part and causes said drive parts to move out of co-operative engagement, and wherein during said applied stroke, said engagement of said camming device and said one drive part causes said camming device to move into said inoperative position at which it is unable to cause release of said co-operative engagement.

25. A cable actuating system according to claim 24, wherein said one drive part includes a first engagement surface, which is engaged by said camming device during said release stroke, so as to cause the drive parts to move out of co-operative engagement, and a second engagement surface which is engaged by said camming device during said applied stroke so as to cause said camming device to move into said inoperative position.

* * * * *